June 18, 1935.  E. P. HOCKING  2,005,033

MILK COOLER

Filed May 16, 1934

INVENTOR
EDWARD P. HOCKING

By Fetherstonhaugh & Co.
Attorneys

Patented June 18, 1935

2,005,033

UNITED STATES PATENT OFFICE 2,005,033

MILK COOLER

Edward Percival Hocking, Toronto, Ontario, Canada, assignor of one-half to Bert Grant, Toronto, Ontario, Canada Application May 16, 1934, Serial No. 725,864

2 Claims. (Cl. 62—142)

My invention relates to improvements in milk coolers, and the object of the invention is to devise a simple, cheap and portable device which is adaptable for use on the farm for chilling the milk immediately after each milking, and it consists essentially of the arrangement and construction of parts as hereinafter more particularly explained.

Like characters of reference indicate corresponding parts in the different views.

Figure 1:
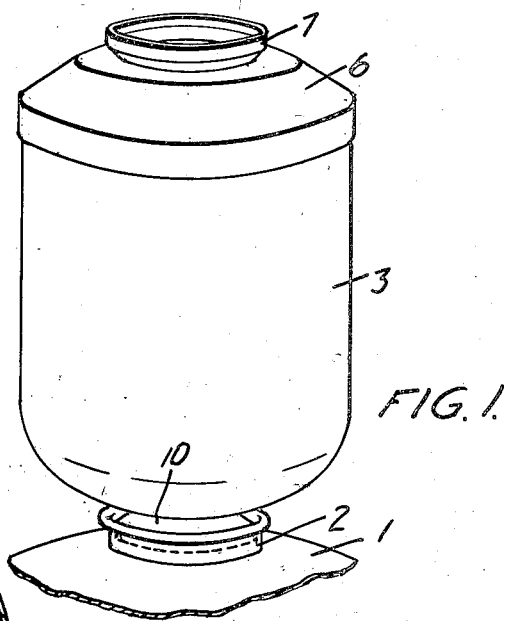
Fig. 1 is a perspective view of my cooler applied to a milk can.
Figure 3:
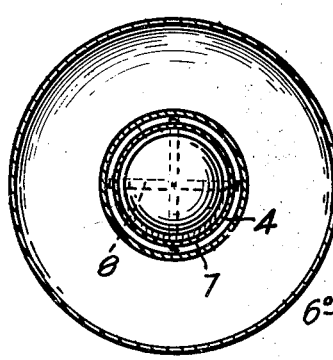
Fig. 3 is a plan sectional view on line 3—3 Fig. 2.
Figure 2:
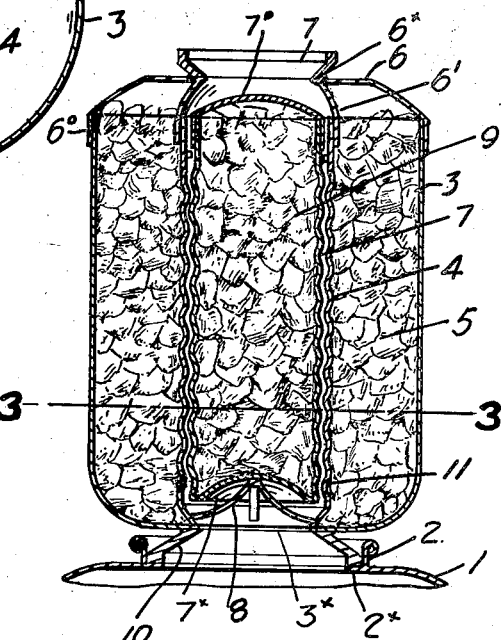
Fig. 2 is a sectional view through Fig. 1.

1 indicates a milk can having the usual mouth 2 having the interior flange $2^x$ on which my cooler is supported. 3 is a cylindrical casing having an open upper end and a closed lower end having a central orifice $3^x$. 4 is an inner cylindrical wall extending up from the orifice $3^x$ to the top of the casing 3 and forming an annular chamber between the walls of the cylinder 4 and casing 3 for containing ice 5.

6 is a cover having a central orifice $6^x$ around which is secured a funnel flange $7^1$ through which the milk is poured. The cover 6 is provided with an outer flange $6^0$ extending around the upper end of the casing 3 and an inner flange $6^1$ extending around the orifice $6^x$ at its upper end and around the upper end of cylinder 4 at its lower end.

7 is a cylinder having a closed lower end which is recessed at $7^x$ to receive a supporting spider 8 mounted on the tapered lower end of the cylindrical wall 4. The upper end of the cylinder 7 is provided with a closing cap $7^0$ and is filled with a charge of ice 9. 10 is a conical supporting flange secured to the lower end of the casing 3 around the orifice $3^x$ and fitting at its lower end upon the flange $2^x$ and within the mouth 2 of the milk can. The cylinder 7 is spaced from the wall 4 and held in such spaced position by pin projections 11 extending from the wall 4.

The wall of the cylinder 7 and the opposing cylindrical wall 4 are corrugated so as to increase the area of cooling surface over which the milk passes.

As each cow is milked the warm milk is poured from the pail through the funnel $7^1$ so as to pass down in a thin film through the interspace to be chilled as it passes over the surface of the opposing walls of the cylinders 4 and 7 to pass down through the orifice $3^x$ into the milk can 1.

From this description it will be seen that I have devised a very simple, cheap and portable device particularly adaptable for use by farmers for chilling the milk immediately each cow is milked.

What I claim as my invention is:

1. A milk cooler comprising an outer annular ice chamber, a supporting flange extending around the open centre of the chamber at its lower end and adapted to fit the mouth of a milk can, a cylindrical ice chamber having a segmental spherical recess at its lower end, a spider carried by the outer chamber and extending upward at its centre into the recess to centre the lower end of the inner chamber, and spacing means between the upper end of the inner and outer chambers to permit a film of milk passing downward in contact with the walls of the inner and outer chambers to pass into a milk can when poured into the upper end of the open centre.

2. A milk cooler comprising an outer annular ice chamber, a supporting flange extending around the open centre of the chamber at its lower end and adapted to fit the mouth of a milk can, a cylindrical ice chamber, a spider carried by the outer chamber upon which the inner chamber is freely supported, and spacing means between the upper end of the inner and outer chambers to permit a film of milk passing downward in contact with the walls of the inner and outer chambers to pass into a milk can when poured into the upper end of the open centre.

EDWARD PERCIVAL HOCKING.